United States Patent
Li et al.

(10) Patent No.: US 10,827,076 B1
(45) Date of Patent: Nov. 3, 2020

(54) ECHO PATH CHANGE MONITORING IN AN ACOUSTIC ECHO CANCELER

(71) Applicant: CIRRUS LOGIC INTERNATIONAL SEMICONDUCTOR, LTD., Edinburgh (GB)

(72) Inventors: Ying Li, Chandler, AZ (US); Venkat Anant, Phoenix, AZ (US); Wilbur Lawrence, Tempe, AZ (US); Seth Suppappola, Tempe, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 0 days.

(21) Appl. No.: 16/815,936

(22) Filed: Mar. 11, 2020

(51) Int. Cl.
*H04M 9/08* (2006.01)
*H04R 3/02* (2006.01)

(52) U.S. Cl.
CPC ............ *H04M 9/082* (2013.01); *H04R 3/02* (2013.01)

(58) Field of Classification Search
CPC ........ H04M 9/082; H04M 3/002; H04R 3/02; G10L 2021/02166; G10L 2021/02082; G10L 21/02; G10L 21/0216
USPC ......... 379/406.08, 406.01, 406.05; 381/71.1, 381/71.12; 455/570
See application file for complete search history.

(56) References Cited

U.S. PATENT DOCUMENTS

| | | | |
|---|---|---|---|
| 6,035,034 A | 3/2000 | Trump | |
| 6,226,380 B1 | 5/2001 | Ding | |
| 6,944,288 B2 | 9/2005 | Seibert et al. | |
| 6,947,552 B2 | 9/2005 | Takada | |
| 7,508,931 B2 | 3/2009 | Johnston et al. | |
| 7,555,117 B2 | 6/2009 | Suppappola et al. | |
| 7,613,291 B1 | 11/2009 | Benyassine et al. | |
| 7,817,797 B2 | 10/2010 | Popovic et al. | |
| 8,411,846 B2 | 4/2013 | Tan | |
| 8,953,777 B1 * | 2/2015 | Chhetri ............... | H04M 1/6041 379/406.08 |
| 10,014,906 B2 | 7/2018 | Zargar et al. | |
| 10,250,740 B2 | 4/2019 | Mani et al. | |
| 2017/0208170 A1 * | 7/2017 | Mani ..................... | H04M 9/082 |

* cited by examiner

*Primary Examiner* — Norman Yu
(74) *Attorney, Agent, or Firm* — Mitch Harris, Atty at Law, LLC; Andrew M. Harris

(57) ABSTRACT

An acoustic echo path change detector provides a monitoring process in an acoustic echo canceler that removes echo from a microphone signal using an adaptive echo path model that generates an echo estimate from a playback signal. The acoustic echo canceler removes the echo estimate from the microphone signal to provide an echo-canceled output signal. The path change detector receives the microphone signal, the echo estimate and the output signal and determines a rate of change of one or more statistical values dependent on the microphone signal, the echo estimate and the output signal. If the rate of change exceeds a threshold value, the echo path change detector generates an indication that causes a supervisory process to change adaptation of the adaptive echo path model to increase responsiveness to the change in the acoustic echo path, e.g., by increasing the step size.

30 Claims, 12 Drawing Sheets

ECHO PATH CHANGE MONITORING IN AN ACOUSTIC ECHO CANCELER

BACKGROUND

1. Field of Disclosure

The field of representative embodiments of this disclosure relates to methods and systems that cancel acoustic echo in devices such as speakerphones, smart speakers, wireless telephones, voice conferencing systems, voice controlled devices, automated personal assistant devices, and other devices that acoustically reproduce playback/remote audio and convert ambient sound to electrical signals.

2. Background

Devices such as speakerphones, smart speakers and wireless telephones in speakerphone mode project a playback signal, which is generally remote speech, but may include program audio, computer-generated speech, alert sounds, background music, and the like, which are received by a microphone that also receives speech from a person speaking in the room. Cancellation techniques are used to remove the playback audio from the microphone signal including the echo that is present due to reflection of the playback audio from walls and other objects within the room, in order to provide good intelligibility at the remote end of a connection and accurate speech recognition in devices such as smart speakers. Such systems are referred to as acoustic echo cancellation systems or acoustic echo cancelers (AECs). The AECs are typically adaptive systems that use one or more adaptive filters to model the acoustic echo path(s) between the playback speaker(s) and the microphone(s) to produce echo estimate(s) from the playback signal(s) and the microphone signal(s). However, since the echo path may vary over time, such as with movement of living beings or objects in the room, repositioning of the playback device, or air temperature variation, it is generally necessary to adapt the AEC continuously or frequently as the echo paths change.

It is desirable to know when the acoustic echo path changes in order to update the echo estimate quickly. Having too fast of an adaptive response in the echo estimator can lead to instability or excessive sensitivity to near-side disturbance Having too slow a response causes poor echo path tracking, which can result in echo in the uplink audio, which can cause missed trigger words, inaccurate speech recognition and/or an uncomfortable listening experience for listeners to uplink audio at the remote end of a conversation. A particular challenge to accurate adaptation of the echo path estimate is "double talk" which is near-end speech that overlaps the playback audio. When double talk is present, it is desirable to slow/stop adaptation and/or reduce the step size of the adaptive filter control so that the AEC does not confuse near-end speech with echo and mis-adapt the echo path estimator. However, when actual changes in the echo path occur, it is desirable to increase the rate of adaptation and/or increase the step size of the adaptive filter control so that the AEC can quickly accommodate the change in the acoustic environment.

Many schemes have been implemented to detect echo path change. The echo path change detection systems generally detect changes in echo return loss enhancement (ERLE), which is a measure of how much echo is removed by an AEC, and which may be reduced when the acoustic echo path changes. However, it is difficult to measure ERLE accurately in situ, and ERLE estimates can be susceptible to double talk, which can cause the ERLE estimate to be erroneously reduced.

Therefore, it would be advantageous to provide an acoustic echo canceler with improved echo path change detection.

SUMMARY

Improved operation of acoustic echo cancelers may be accomplished in a method, a control system that provides enhanced echo path change detection, and a computer program product for implementing the echo path change detection method in a digital signal processing circuit.

The method and system monitor an acoustic echo canceler (AEC) that removes an estimate of acoustic echo from a microphone signal to produce an echo-canceled output, to determine whether a change in an acoustic echo path has occurred. The method and system determine whether or not the acoustic echo canceling subsystem is operating properly by determining at least one statistical value dependent on the microphone signal, the echo-canceled output and the estimate of acoustic echo, determining the rate(s) of change of the statistical value(s) and comparing the rate(s) of change to threshold value(s) corresponding to the at least one statistical value. If the rate of change exceeds the threshold, the operation of the acoustic echo canceling subsystem is altered in order to increase responsiveness to the change in the acoustic echo path.

The method and system may determine multiple statistical values and alter the operation of the acoustic echo canceling subsystem if any of multiple rates of change corresponding to the multiple statistical values exceed corresponding threshold values. The statistical values may include: an absolute value of a sum of coefficients of determination of the estimate of acoustic echo with respect to the microphone signal and the echo-canceled output with respect to the microphone signal further reduced by a constant, an absolute value of a sum of energy levels of the echo-canceled output and the estimate of the acoustic echo, the sum being normalized by the energy of the microphone signal and further reduced by a constant, or other suitable statistical measures derived from the microphone signal, the echo-canceled output and the estimate of acoustic echo. The operation of the acoustic echo canceling subsystem may also be altered if a ratio of an energy of the echo-canceled output to the energy of the microphone signal exceeds a threshold. The operation of the acoustic echo canceling subsystem may be altered to respond to detected echo path change by reducing a step size and/or increasing an update rate of an adaptive echo path estimator that generates the estimate of acoustic echo. In addition to controlling the AEC in order to suppress echo while the AEC is re-converging, upon the detection of the echo path change, the system may also be forced into half duplex operation, which is to suppress both echo and near-end signals in the uplink when playback is active.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure encompasses monitoring and supervisory techniques and circuits that may be implemented in a smart speaker, speakerphone, wireless telephone that includes an acoustic echo canceler (AEC). The AEC removes an estimate of acoustic echo of a playback signal from a microphone signal to produce an echo-canceled microphone output and is monitored to determine whether a change in an acoustic echo path has occurred that will affect operation of the AEC. The method and system determine whether or not the acoustic echo canceling subsystem is operating properly by determining at least one statistical value dependent on the microphone signal, the echo-canceled output and the estimate of acoustic echo, determining a rate of change of the statistical value(s) and comparing the rate(s) of change to threshold value(s) corresponding to the at least one statistical value. If the rate of change exceeds the threshold, the operation of the acoustic echo canceling subsystem is altered in order to increase responsiveness to the change in the acoustic echo path. Although this text refers generically to a microphone signal when referring to the signal corrupted by echo, it is apparent to those skilled in the art that the microphone signal may be preprocessed by filters, gain, or other linear operations.

Figure 1:
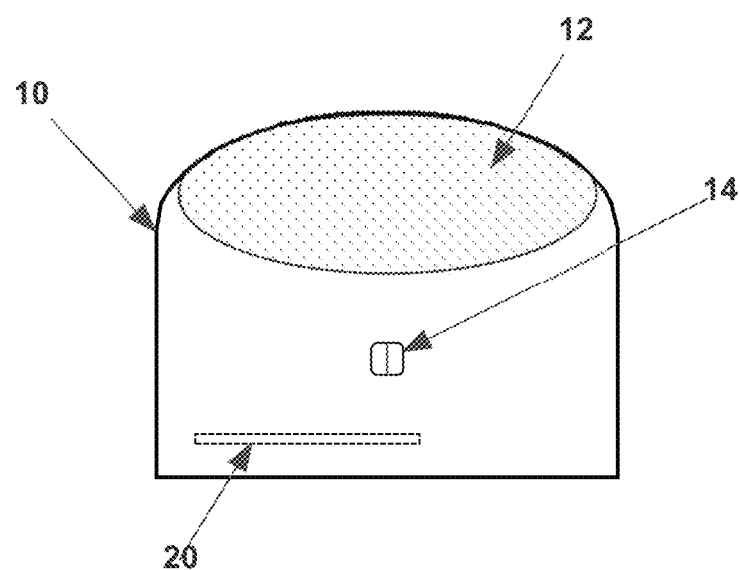
FIG. 1 is an illustration of a speakerphone 10, which is an example of a device in which the techniques disclosed herein are implemented.

Referring now to FIG. 1, an example device incorporating an AEC is shown in the form of a speakerphone 10. Speakerphone 10 is one embodiment that may incorporate techniques in accordance with the instant disclosure but does not limit the scope of the potential applications of the techniques disclosed herein. In general, the techniques of the instant disclosure may be employed in smart phones, wireless telephones having speaker mode capabilities, smart speakers, and other devices that project playback or remote audio acoustically into a room while measuring ambient audio in order to pickup near-end speech and other sound. Speakerphone 10 includes an acoustic output transducer in the form of a loudspeaker 12 and an acoustic input transducer in the form of a microphone 14. An internal speakerphone circuit 20 provides connection of microphone 14 and loudspeaker 12, acoustic echo cancellation, a network interface, which may be a wireless interface connecting through protocols such as BLUETOOTH, wireless Ethernet, to a mobile phone network, and the like, or a wired interface such as a Universal Serial Bus (USB) connection or a telephone subscriber line interface (POTS). Speakerphone circuit 20 will also include other speakerphone features as needed to support the particular type of speakerphone connection, such as line interfaces and line echo cancelers for a subscriber line, or controller functionality to implement USB or BLUETOOTH interfaces. (BLUETOOTH is a registered trademark of BLUETOOTH SIG, INC.)

Figure 2:
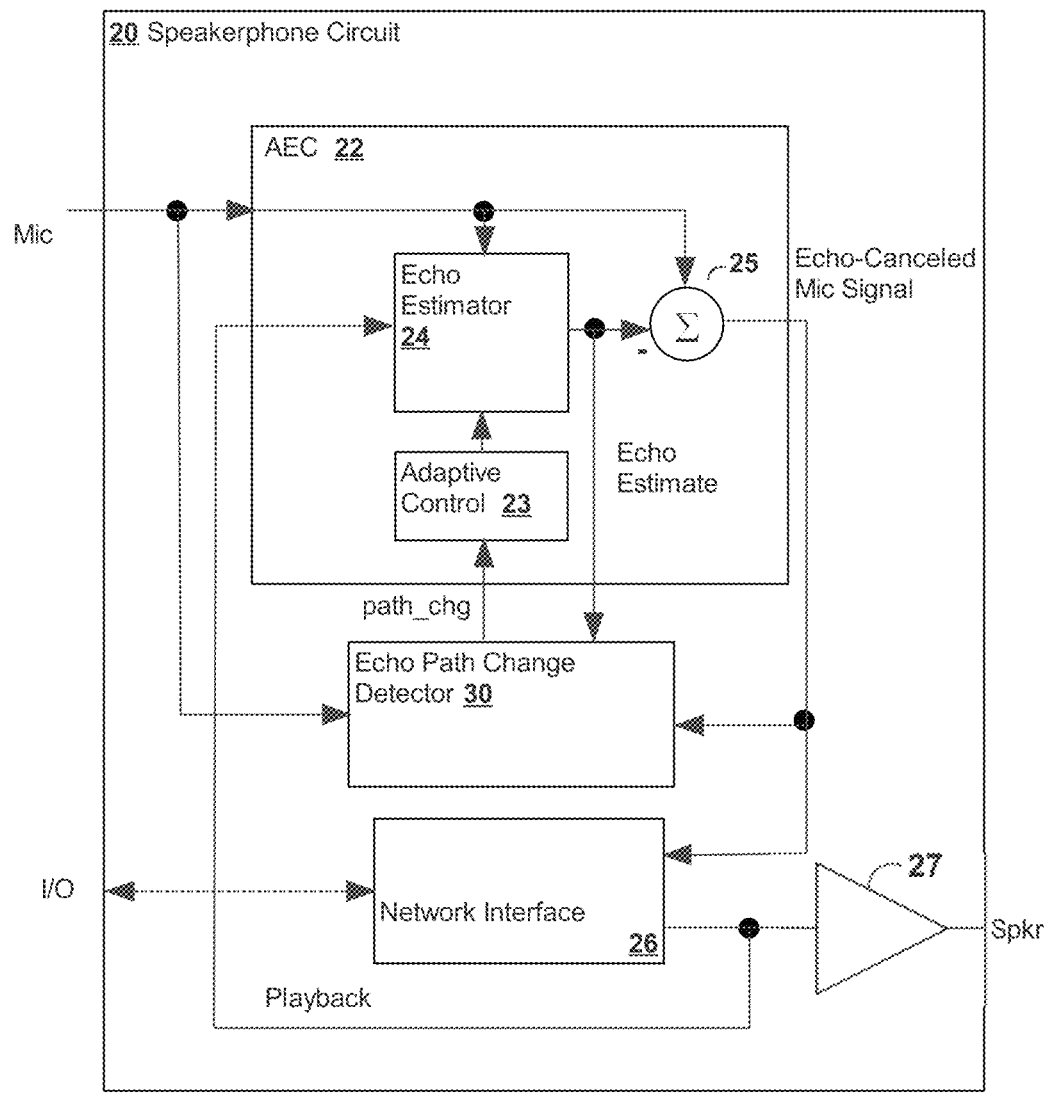
FIG. 2 is a block diagram of speakerphone circuit 20 within speakerphone 10.

Referring now to FIG. 2, details of an example speakerphone circuit 20 that pertain to the AEC of the instant disclosure are shown. Microphone 14 (not shown) provides a microphone signal Mic, which is provided to an AEC 22 that removes echo from microphone signal Mic, to generate an echo-canceled microphone signal that is, in turn, provided as an input to a network interface 24 so that an echo-canceled measure of the ambient sound is sent to the remote end of a telephone conversation, a network-based speech recognition server, or other target for the echo-canceled ambient sound that is appropriate to the device. Network interface 24 provides playback audio, which in the illustrated application represents remote speech sent from the remote end of a telephone conversation but may be synthesized speech or other form of playback audio as is suitable for a particular device incorporating an AEC. An amplifier 27 generates an output audio signal Spkr to drive speaker 12 (not shown). Speakerphone circuit 20 may be implemented in one or more special-purpose integrated circuits or may be implemented in more general-purpose processing circuit having analog inputs and outputs for receiving the microphone signal and providing output audio signal Spkr, while implementing the techniques described in further detail below. It will be apparent to those skilled in the art that these same techniques may be applied in soundbars and other similar devices which may not have a direct connection to a network. In this case, the playback content may come indirectly from another device connected to a network (such as a set top box, television, AVR (Audio Video Receiver), etc.), or the playback content may come from an external analog input. Similarly, the echo canceled speech may go to a remote device for speech recognition, or it may be fed to a local speech recognition engine or voice trigger engine for local command processing without requiring network connection.

AEC 22 receives microphone signal Mic and a combiner 25 subtracts the output Echo Estimate of an echo estimator 26 that models one or more acoustic echo paths to generate output Echo-Cancelled Mic Signal. The input of echo estimator is the playback audio signal Playback, which in the illustration is the remote signal provided from network interface 24. Echo estimator 26 is generally an adaptive filter managed by an adaptive control block 23 that controls the adaptation of echo estimator 26. An echo path change detector 30 provides one or more indications path_chg to adaptive control 23 in order to change the rate of adaptation and/or change a step-size coefficient of the adaptation.

Figure 3:
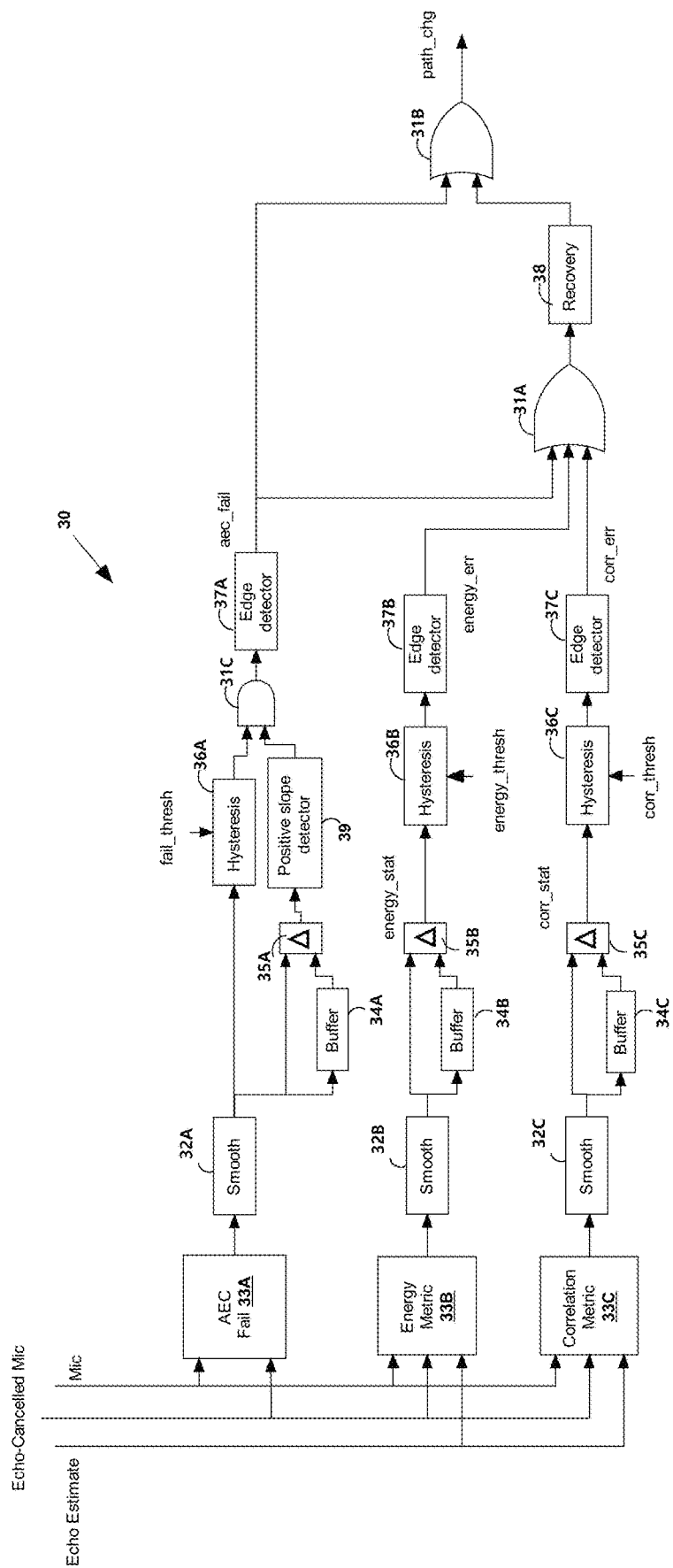
FIG. 3 is a block diagram of echo path change detector 30 within speakerphone circuit 20.

Referring now to FIG. 3, details of an example echo path change detector 30 are shown in accordance with one example embodiment. While the following description is with reference to a circuit block diagram, it is understood that the description and the calculations included therein are applicable to a process that may be implemented by a digital signal processor executing a computer program product according to an embodiment of the disclosure as described in further detail below.

Echo path change detector 30 computes and evaluates three different statistical measures to determine whether or not an echo path change has occurred. One measure is an AEC failure metric, computed by AEC Fail block 33A, which compares the energy of the echo-canceled microphone signal with the energy of microphone signal Mic by computing their ratio:

$$\text{AEC Fail} = \frac{E_{echoCanceledMic}}{E_{Mic}}$$

where $E_{echoCanceledMic}$ is the energy of the echo-canceled microphone signal, and $E_{Mic}$ is the energy of microphone signal Mic. A smoothing process 32A applies smoothing to the AEC failure metric and a buffer 34A, with a tunable length N, saves the smoothed metric values. A thresholding detector (hysteresis block) 36A compares the smoothed AEC failure metric to a threshold fail_thresh and applies hysteresis to determine the occurrence of a path change, which is then processed by an edge detector 37A, if the slope of the AEC failure metric is positive, as determined by a positive slope detector 39. A positive slope detector 39 detects the sign of the slope of AEC failure metric by determining differences between the AEC failure metric and one or more historical AEC failure metric values stored in buffer 34A using a differencing block 35A. A Logical-AND operation 31C qualifies the output of thresholding detector 36A with the output of positive slope detector 39 so that edge detector 37A is only triggered when the AEC failure metric is increasing and exceeds threshold fail_thresh. Edge detector 37A provides a distinct output each time the above failure condition occurs with a rising edge and the output is combined by logical-OR operation 31A with the output of other edge detectors 37B and 37C, so that a recovery timer 38 may be retriggered each time the failure condition occurs. A logical-OR operation 31B asserts echo path change indication path_chg while either the AEC failure condition is detected, or the recovery timer 38 has been triggered by any of edge detectors 37A-37C. If the AEC Failure Statistic exceeds its corresponding threshold, it may be assumed that the echo estimate is diverging due to a path change event. The energy is a statistical value that relates to the variance, and is known because the variance of signal x is given by $\sigma_x^2 = E\{(x-\mu_x)^2\}$, which is the expected value of the square of the signal x with the mean value $\mu_x$ of signal x removed.

The second statistical measure evaluated by path change detector 30 is an AEC Energy Metric computed by an Energy Metric block 33B:

$$\text{Energy Metric} = \left| \frac{E_{echoCanceledMic} + E_{echoEstimate}}{E_{Mic}} - 1 \right|$$

where $E_{echoCanceledMic}$ is the energy of Echo-Canceled Mic, $E_{echoEstimate}$ is the energy of Echo Estimate, and $E_{Mic}$ is the energy of microphone signal Mic. A smoothing process 32B applies smoothing to the Energy Metric and a buffer 34B, with a tunable length N, saves the smoothed metric values. A differencing block 35B determines a rate of change energy_stat of the smoothed Energy Metric from differences between Energy Metric and one or more historical Energy Metric values stored in buffer 34B. A thresholding detector (hysteresis block) 36B compares the rate of change determined by differencing block 35B to a threshold energy_thresh, and applies hysteresis via hysteresis block 36B, to determine the occurrence of an echo path change, which is then processed by an edge detector 37B and combined with the other outputs of edge detectors 37A and 37C by logical-OR operation 31A to trigger recovery timer 38, and thus assert echo path change indication path_chg for the recovery timer period if the rate of change energy_stat of the Energy Metric exceeds threshold energy_thresh.

The third statistical measure evaluated by path change detector 30 is an AEC Correlation Metric computed by Correlation Metric block 33C:

$$\text{Correlation Metric} = |r_y^2 + r_e^2 - 1|$$

where, $r_y^2$ is the coefficient of determination between Echo Estimate and Mic, and $r_e^2$ is the coefficient of determination between Echo-Cancelled Mic and Mic. A smoothing process 32C applies smoothing to the Correlation Metric and a buffer 34C, with a tunable length N, saves the smoothed metric values. A differencing block 35C determines a rate of change corr_stat of the smoothed Correlation Metric from differences between Correlation Metric and one or more historical Correlation Metric values stored in buffer 34C. A thresholding detector (hysteresis block) 36C compares the rate of change determined by differencing block 35C to a threshold corr_thresh, and applies hysteresis via hysteresis block 36C, to determine the occurrence of an echo path change, which is then processed by an edge detector 37C and combined with the other outputs of edge detectors 37A and 37B by logical-OR operation 31A to trigger recovery timer 38, and thus assert echo path change indication path_chg for the recovery timer period if the rate of change corr_stat of the Correlation Metric exceeds thresholdcorr_thresh.

If any of the above three statistic comparisons exceed their corresponding thresholds, then path_chg will be asserted by logical-OR operation 31B for at least the recovery period initiated by the triggering of recovery timer 38 by the corresponding one of edge detectors 37A-37C, which, in turn, causes adaptive control 23 to increase step size and/or increase update rate to increase responsiveness of the AEC to adapt to the detected change in the acoustic echo path. Additionally, if the output aec_fail of edge detector 37A is true, echo path change indication path_chg will be asserted immediately via logical-OR operation 31B.

Figure 4:
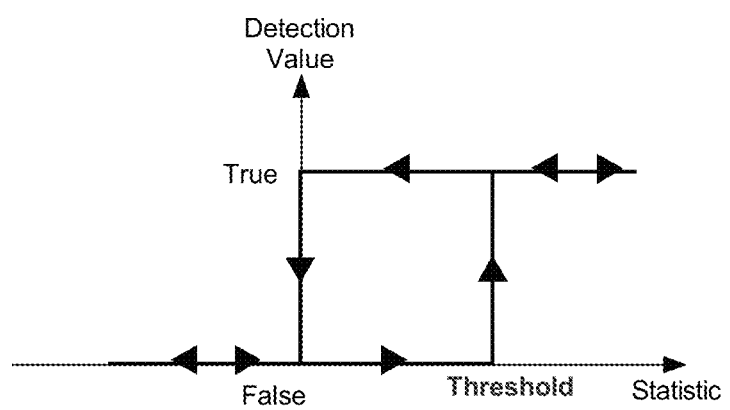
FIG. 4 is a graph depicting hysteresis implemented by hysteresis blocks 36A-36C of echo path change detector 30.

FIG. 4 shows an example hysteresis scheme as may be applied by hysteresis blocks 36A-36C in echo path change detector 30 of FIG. 3, which results in holding the True value of the detection until the input value of the corresponding Statistic falls to zero, and holding the False value of the detection until the input value of the corresponding Statistic reaches Threshold.

Figure 5A:
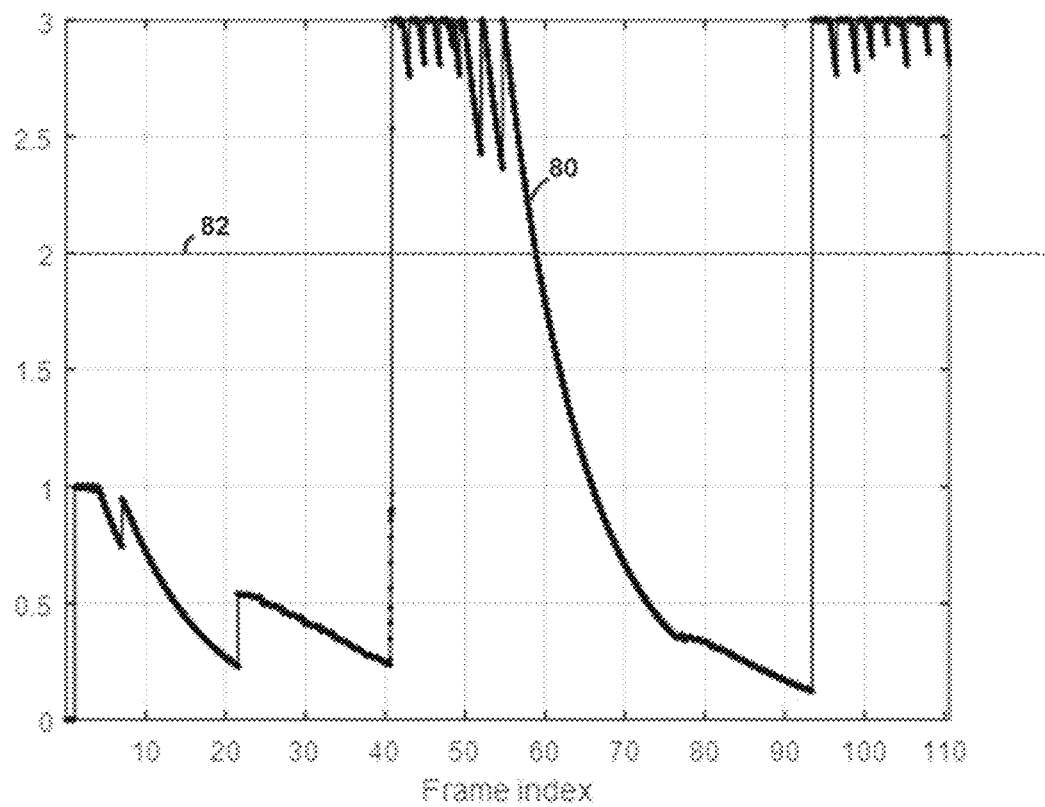
FIGS. 5A-5C are graphs depicting operation of echo path change detector 30.
Figure 5B:
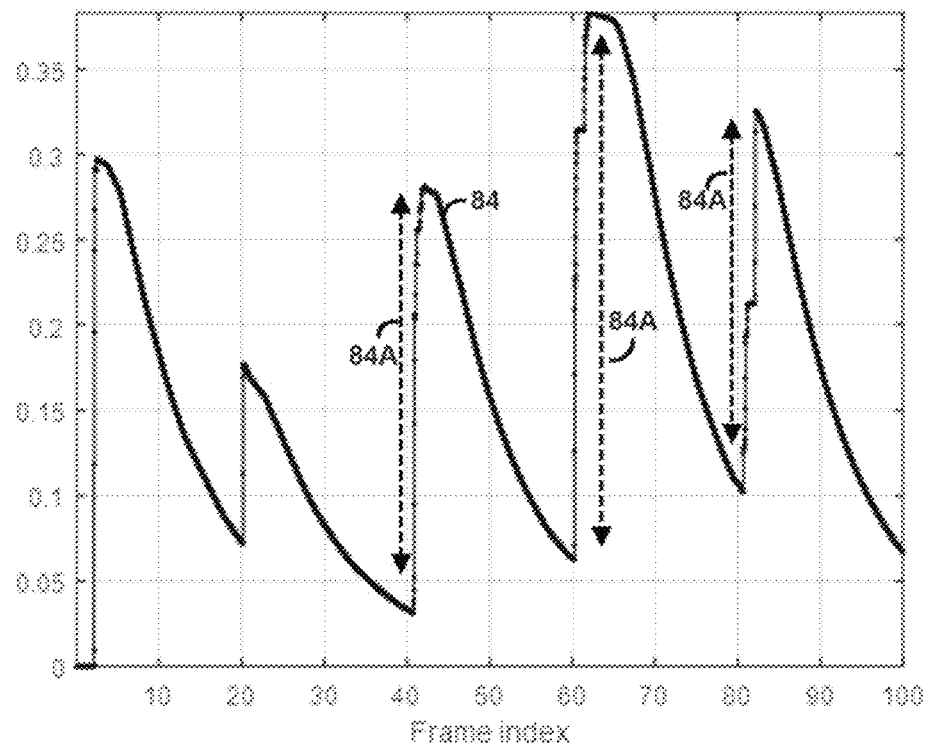
Figure 5C:
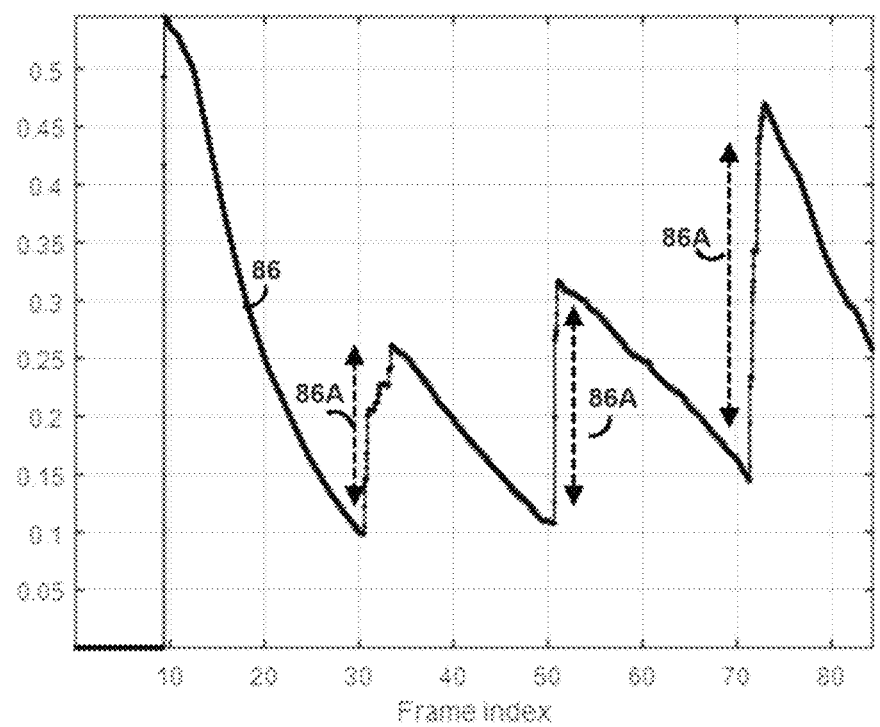

Referring now to FIG. 5A, an example graph is shown depicting the value of the AEC Failure Statistic 80 over frames of computation of the statistic. The corresponding threshold value 82 used to determine if an echo path change has occurred is also shown on the graph. As seen in the graph, an echo path change has been detected at around frame 42 and also at around frame 93. FIG. 5B shows an example graph 84 of Energy Metric. Since it is the rate of change of the Energy Metric that is compared to the corresponding threshold, jumps 84A in the Energy Metric are what initiate triggering of the echo path change indication in output energy_err. Each of the jumps 84A in the Energy Metric shown in graph 84 corresponds to an echo path change, so a suitable threshold for the Energy Metric change energy_stat may be 0.2. FIG. 5C shows an example graph 86 of Correlation Metric. Since it is the rate of change of the Correlation Metric that is compared to its corresponding threshold, jumps in the Correlation Metric are what initiate triggering of the echo path change indication in output corr_err. Each of the jumps 86A in Correlation Metric shown in graph 86 correspond to an echo path change, and a suitable threshold for the Correlation Metric change corr_stat may also be 0.1.

Figure 6A:
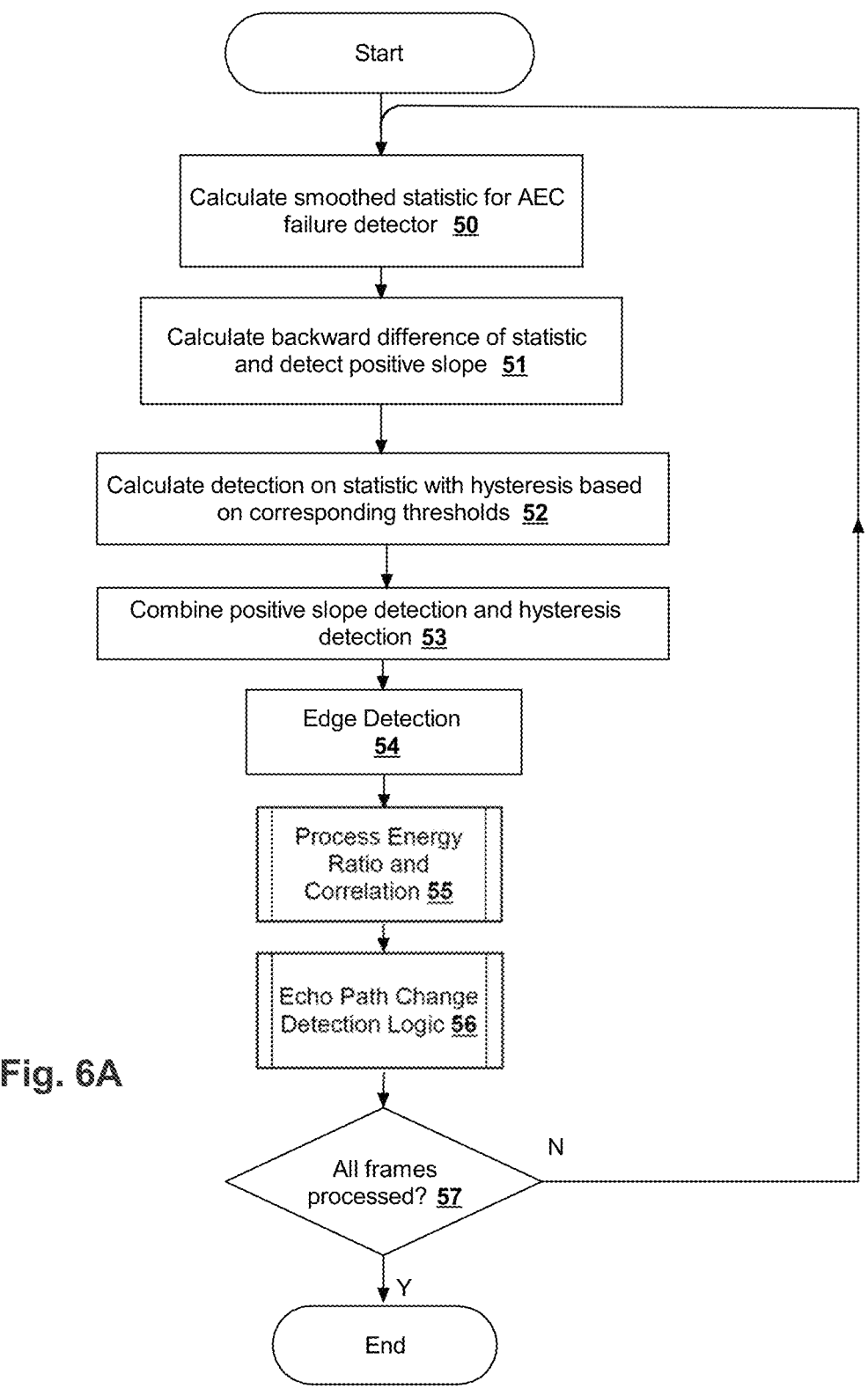
FIGS. 6A-6C are flowcharts depicting operation of echo path change detector 30 as implemented by signal processing circuit 90 of FIG. 7.
Figure 6B:
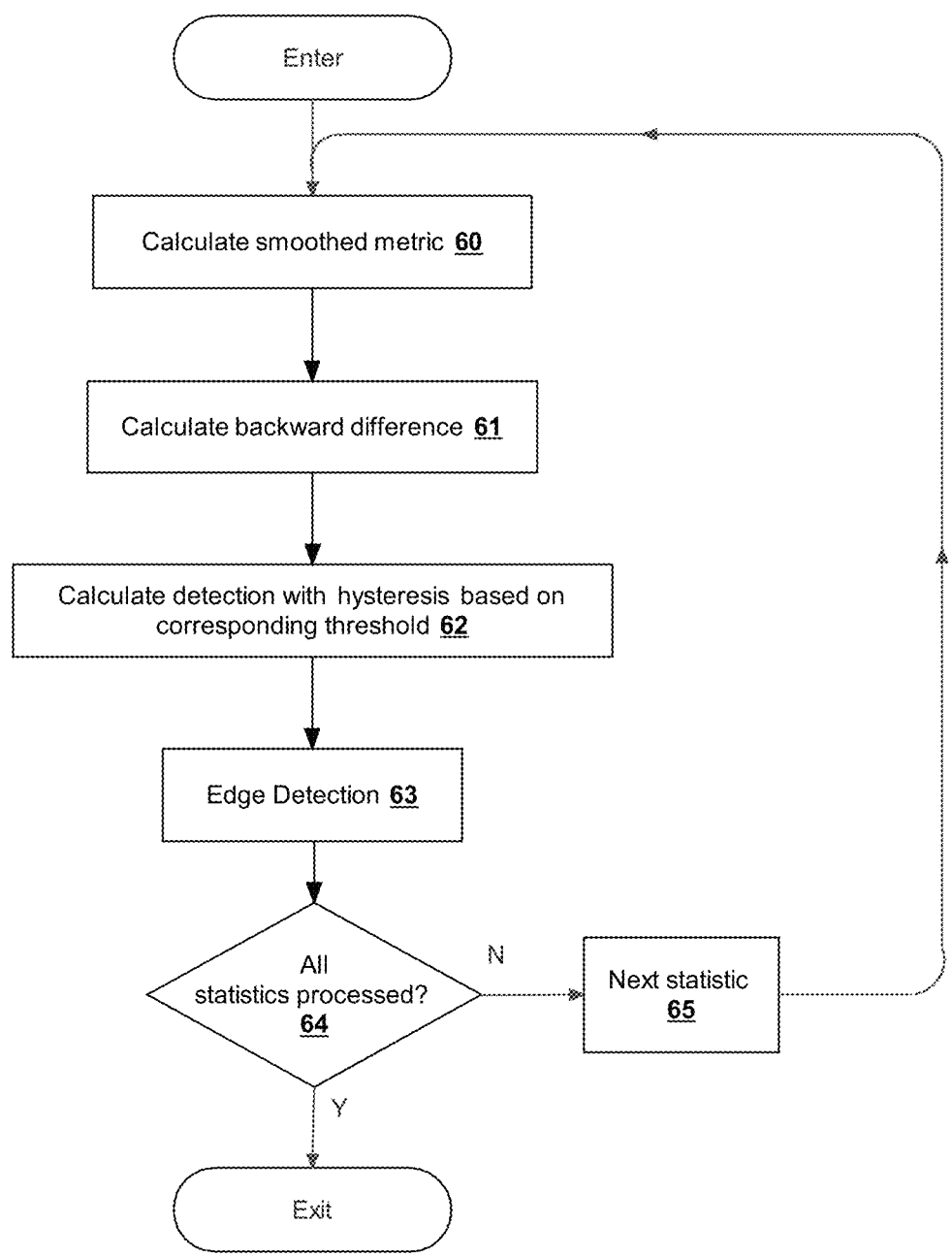
Figure 6C:
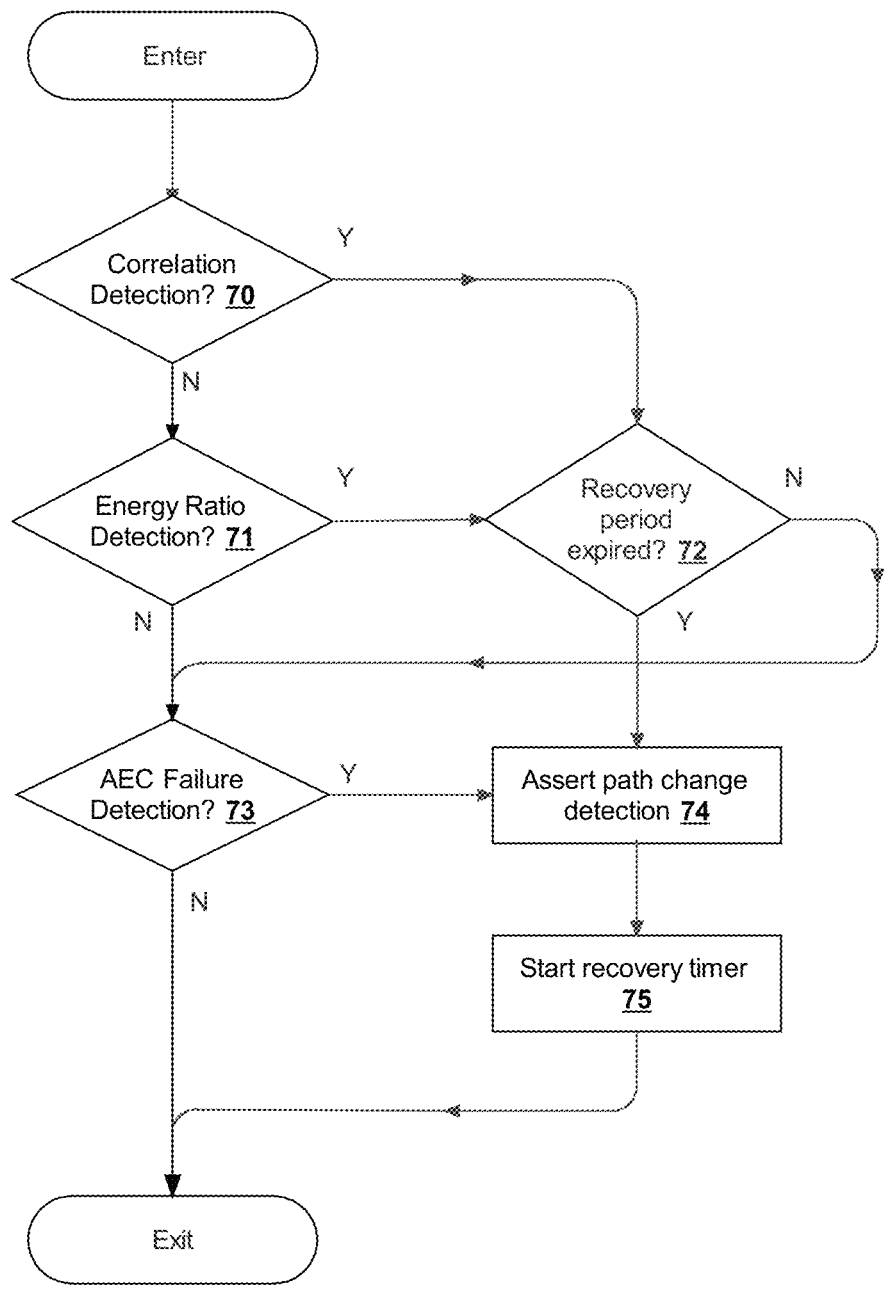
Figure 7:
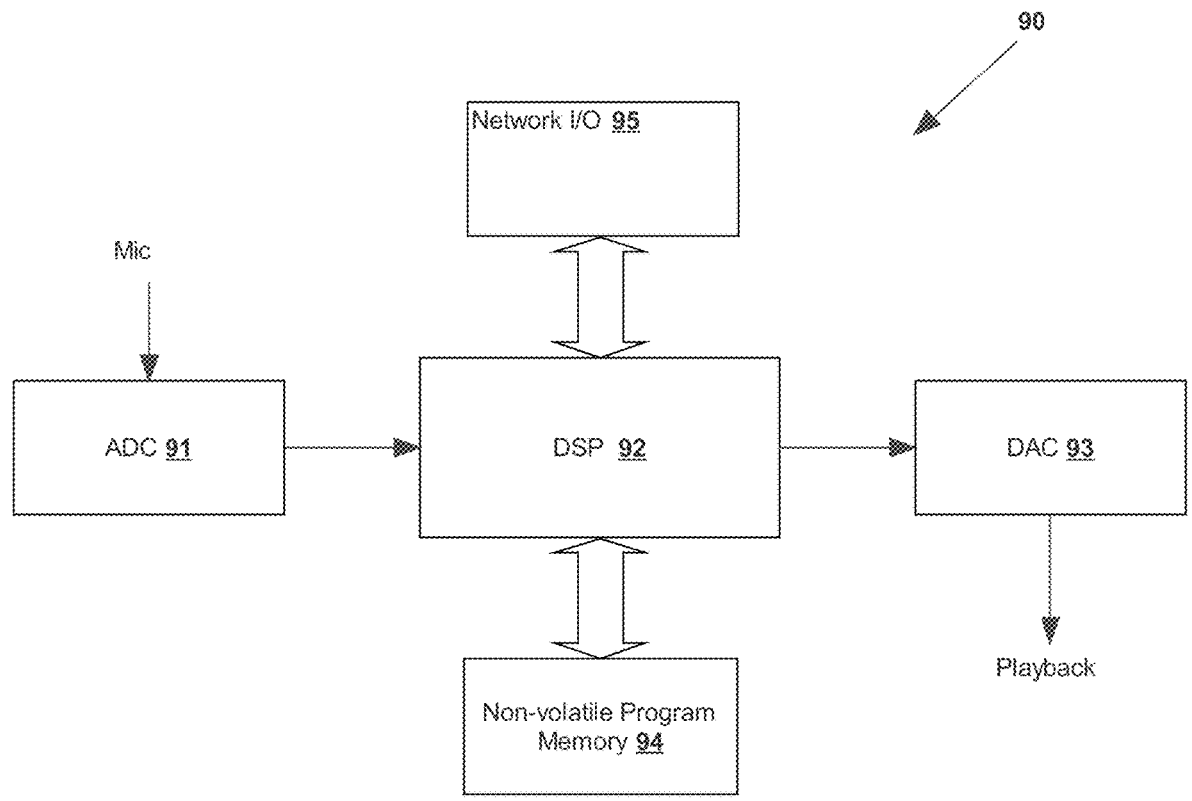
FIG. 7 is a block diagram of a signal processing circuit 90 that are used to implement speakerphone circuit 20.

Referring now to FIGS. 6A-6C, an example flowchart is shown that illustrates the method of detecting an echo path change as disclosed herein and which is embodied in the instructions of the computer program product stored in non-volatile memory 94 of FIG. 7. FIG. 6A shows the main process, in which the smooth statistic for the AEC failure detector is computed (step 50), the backward difference of the AEC Fail metric is calculated and positive slope of the AEC Fail metric is detected (step 51). The detection on the AEC Fail statistic is calculated with hysteresis based on the threshold(s) applied (step 52), and the positive slope detection and hysteresis detection are combined (step 53). Edge detection is performed on the result of step 53 (step 54). The Energy Metric and Correlation Metric are processed (step 55) according to the process set forth in FIG. 6B, and echo path change detection logic is applied according to the process set forth in FIG. 6C. Until all of the frames are processed (decision 57), the process of steps 50-57 is repeated.

FIG. 6B shows the process of evaluating Energy Metric and Correlation Metric. A smoothed metric is computed (step 60) and the backward difference is computed to determine the rate of change (step 61). The detection is calculated with the corresponding threshold and hysteresis applied (step 62) and edge detection is then performed (step 63). Until each of the statistical measures has been processed (decision 64), the next statistic is processed (step 65) by repeating the process of steps 60-63.

FIG. 6C illustrates the detection logic process applied to the detection results. If the Correlation Metric evaluation results in a detection (decision 70) and/or the Energy Ratio evaluation results in a detection (decision 71) and a previously-set recovery period has not expired (decision 72), then if the AEC Failure evaluation results in a detection (decision 73), echo path change indication path_chg is asserted (step 74) and the recovery timer is started (step 75). Otherwise, if the Correlation Metric evaluation results in a detection (decision 70) and/or the Energy Ratio evaluation results in a detection (decision 71) and there is no recovery period waiting to expire (decision 72), then echo path change indication path_chg is asserted (step 74) and the recovery timer is started (step 75). While the flowchart of FIG. 6A-6C illustrates a progressive computation and check through the statistics used to detect echo path change, in practice, each of the statistics is computed on a continuous basis, at least until one of the thresholds is exceeded. Therefore, the exact program flow of FIG. 6A-6C is only illustrative of a process by which the detections may be performed and is not limiting as to the manner in which the techniques of the present disclosure are performed.

Referring now to FIG. 7, a digital signal processing system is shown, which may be used to implement the techniques of the present disclosure. A digital signal processor (DSP) 92 (or a suitable general purpose processor) executes program instructions stored in a non-volatile memory 94 and that form a computer-program product in accordance with the present disclosure. A network I/O block provides 95 connections such as those described above for network interface 24 of FIG. 2. An analog-to-digital converter (ADC) 91 receives microphone signal Mic provides samples of the values of microphone signal Mic to DSP 92. A digital-to-analog converter 93 generates playback (remote content such as speech or music) output Playback from values received from network I/O block 95, and which is generally amplified and reproduced by a loudspeaker (not shown). The echo-canceled microphone signal sample values are sent to the remote location by network I/O block 95 for reproduction at a remote endpoint, which is generally either a remote telephone receiver or a speech recognition server.

As mentioned above, portions or all of the disclosed process may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium includes the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the flowchart(s) and block diagrams described above may be implemented by computer-readable program instructions. These computer readable program instructions may also be stored in other storage forms as mentioned above and may be downloaded into a non-volatile memory for execution therefrom. However, the collection of instructions stored on media other than the AEC system non-volatile memory described above also form a computer program product that is an article of manufacture including instructions which implement aspects of the function/act specified in the flowchart and/or block diagram block or blocks.

Figure 8:
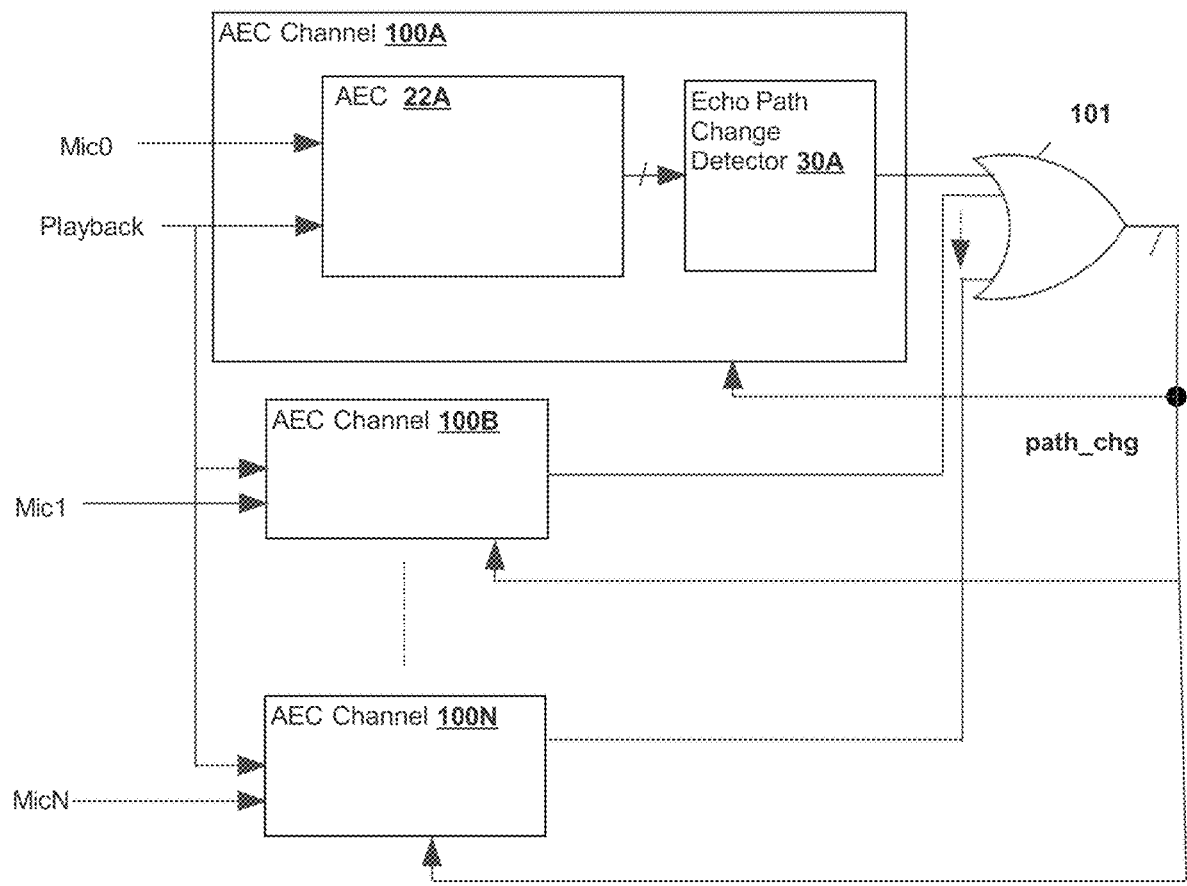
FIG. 8 is a block diagram of a multi-channel system having multiple AECs 100A-100N.

Referring now to FIG. 8, an AEC system is shown that incorporates multiple AEC channels 100A, 100B-100N. Each AEC channel 100A, 100B . . . , 100N corresponds to a microphone, in which microphone signals Mic0, Mic1, . . . , MicN are processed by corresponding AEC channel 100A, 100B-100N to produce echo-canceled microphone signals. Each AEC channel 100A, 100B-100N has a corresponding echo path change detector 30A, which may be implemented by the architectures and techniques described above. In the illustrated example, the outputs of echo path change detectors 30A are combined by a logical-OR operation 101, so that if any individual statistic detector within any of echo path change detectors 30A is triggered, the entire system will be caused to adapt more rapidly via a larger step size and/or increased adaptation rate in response to echo path change indication path_chg. However, other logical operations for combining the individual echo path change are envisioned, such as majority detection, or having each output of echo path change detectors 30A control the adaptation of only the corresponding one of AEC channels 100A, 100B-100N.

While the disclosure has shown and described particular embodiments of the techniques disclosed herein, it will be understood by those skilled in the art that the foregoing and other changes in form, and details may be made therein without departing from the spirit and scope of the disclosure. For example, the detection techniques of the disclosed embodiments may be included echo path detection in devices that model acoustic or other echo paths and for purposes other than canceling the echo.

What is claimed is:

1. A method of monitoring an acoustic echo canceler that removes an estimate of acoustic echo from a microphone signal to produce an echo-canceled output to determine whether a change in an acoustic echo path has occurred, the method comprising:
   determining at least one statistical value dependent on the microphone signal, the echo-canceled output and the estimate of acoustic echo;
   determining a corresponding at least one rate of change of the at least one statistical value;
   comparing the at least one rate of change to a corresponding one of at least one corresponding threshold value corresponding to the at least one statistical value;
   responsive to the at least one rate of change exceeding the corresponding at least one threshold value, generating an indication that the acoustic echo path has changed; and
   altering operation of the acoustic echo canceler to increase responsiveness to the change in the acoustic echo path as indicated by the indication.

2. The method of claim 1, wherein the at least one statistical value includes a first absolute value of a first intermediate value, wherein the first intermediate value is equal to a first sum of a first coefficient of determination of the estimate of acoustic echo with respect to the microphone signal and a second coefficient of determination of the echo-canceled output with respect to the microphone signal less a constant, wherein the method further comprises determining a first rate of change of the first absolute value, wherein the comparing compares the first rate of change of the first absolute value to a first threshold value, and wherein the generating an indication generates the indication if the first rate of change of the first absolute value exceeds the first threshold value.

3. The method of claim 2, wherein the at least one statistical value includes a second absolute value of a second intermediate value, wherein the second intermediate value is equal to a second sum of a first energy of the echo-canceled output and a second energy of the estimate of the acoustic echo, wherein the second sum is normalized by a third energy of the microphone signal and further reduced by a constant to yield the first intermediate value, and wherein the method further comprises determining a second rate of change of the second absolute value, wherein the comparing compares the second absolute value to a second threshold value, and wherein the generating an indication generates the indication if either the first rate of change of the first absolute value exceeds the first threshold value or the second rate of change of the second absolute value exceeds the second threshold value.

4. The method of claim 3, wherein the generating an indication further generates the indication if a ratio of the first energy to the third energy exceeds a third threshold value.

5. The method of claim 2, wherein the generating the indication further generates the indication if a ratio of an energy of the echo-canceled output to an energy of the microphone signal exceeds a second threshold value.

6. The method of claim 1, wherein the at least one statistical value includes a first absolute value of a first intermediate value, wherein the first intermediate value is equal to a second sum of a first energy of the echo-canceled output and a second energy of the estimate of the acoustic echo, wherein the second sum is normalized by a third energy of the microphone signal and further reduced by a constant to yield the first intermediate value, and wherein the method further comprises determining a first rate of change of the first absolute value, wherein the comparing compares the first absolute value to a first threshold value, and wherein the generating an indication generates the indication if either the first rate of change of the first absolute value exceeds the first threshold value.

7. The method of claim 6, wherein the generating an indication further generates the indication if a ratio of the first energy to the third energy exceeds a second threshold value.

8. The method of claim 1, wherein the altering an operation comprises at least one of increasing a step size of or increasing a rate of update of an adaptive echo path estimator that adaptively determines the estimate of acoustic echo, in response to the indication.

9. The method of claim 1, wherein the acoustic echo canceler includes a plurality of echo-canceling channels that remove a plurality of estimates of acoustic echo from a plurality of corresponding microphone signals to produce a corresponding plurality of echo-canceled outputs, wherein the determining at least one statistical value determines one or more statistical values corresponding to the plurality of echo-canceling channels dependent on the corresponding one of the plurality of microphone signals, the corresponding echo-canceled output and the corresponding estimate of acoustic echo, wherein the determining at least one corresponding rate of change determines one or more rates of change of the corresponding statistical values, wherein the comparing compares the one or more rates of change to corresponding threshold values, and wherein the generating generates the indication in response to the rates of change exceeding the corresponding threshold values.

10. The method of claim 9, wherein the generating generates the indication in response to any of the rates of change exceeding the corresponding threshold values.

11. A control system for an acoustic echo canceler that removes an estimate of acoustic echo from a microphone signal to produce an echo-canceled output to determine whether a change in an acoustic echo path has occurred, comprising:
   a monitoring subsystem for determining whether or not the acoustic echo canceling subsystem is operating properly, wherein the monitoring subsystem receives the microphone signal, the echo-canceled output and the estimate of acoustic echo as input signals, determines at least one statistical value dependent on the microphone signal, echo-canceled output and the estimate of acoustic echo, wherein the monitoring subsystem determines a corresponding at least one rate of change of the at least one statistical value and if the at least one rate of change exceeds a corresponding one of at least one threshold value corresponding to the at least one statistical value, the monitoring subsystem generates an indication that the acoustic echo path has changed; and
   a supervisory subsystem that alters operation of the acoustic echo canceling subsystem in response to the indication, in order to increase responsiveness to the change in the acoustic echo path.

12. The control system of claim 11, wherein the at least one statistical value includes a first absolute value of a first intermediate value, wherein the first intermediate value is equal to a first sum of a first coefficient of determination of the estimate of acoustic echo with respect to the microphone signal and a second coefficient of determination of the echo-canceled output with respect to the microphone signal less a constant, and wherein the monitoring subsystem determines a first rate of change of the first absolute value, compares the first rate of change of the first absolute value to a first threshold value, and generates the indication if the first rate of change of the first absolute value exceeds the first threshold value.

13. The control system of claim 12, wherein the at least one statistical value includes a second absolute value of a second intermediate value, wherein the second intermediate value is equal to a second sum of a first energy of the echo-canceled output and a second energy of the estimate of the acoustic echo, wherein the second sum is normalized by a third energy of the microphone signal and further reduced by a constant to yield the first intermediate value, and wherein the monitoring system determines a second rate of change of the second absolute value, compares the second absolute value to a second threshold value, and generates the indication if either the first rate of change of the first absolute value exceeds the first threshold value or the second rate of change of the second absolute value exceeds the second threshold value.

14. The control system of claim 13, wherein the monitoring subsystem further generates the indication if a ratio of the first energy to the third energy exceeds a third threshold value.

15. The control system of claim 12, wherein the monitoring subsystem further generates the indication if a ratio of an energy of the echo-canceled output to an energy of the microphone signal exceeds a second threshold value.

16. The control system of claim 11, wherein the at least one statistical value includes a first absolute value of a first intermediate value equal to a first sum of a first energy of the echo-canceled output and a second energy of the estimate of the acoustic echo, wherein the first sum is normalized by a third energy of the microphone signal and further reduced by a constant to yield the first intermediate value, and wherein the monitoring system determines a first rate of change of the first absolute value, compares the first absolute value to a first threshold value, and generates the indication if either the first rate of change of the first absolute value exceeds the first threshold value.

17. The control system of claim 16, wherein the monitoring subsystem further generates the indication if a ratio of the first energy to the third energy exceeds a second threshold value.

18. The control system of claim 11, wherein the supervisory subsystem performs at least one of increasing a step size of or increasing a rate of update of an adaptive echo path estimator that adaptively determines the estimate of acoustic echo, in response to the indication.

19. The control system of claim 11, wherein the acoustic echo canceler includes a plurality of echo-canceling channels that remove a plurality of estimates of acoustic echo from a plurality of corresponding microphone signals to produce a corresponding plurality of echo-canceled outputs, wherein the monitoring subsystem receives the plurality of microphone signals, the corresponding plurality of echo-canceled outputs and the corresponding estimates of acoustic echo as input signals, determines a plurality of statistical values for the plurality of echo-canceling channels that are dependent on the corresponding microphone signal, the corresponding echo-canceled output and the corresponding estimate of acoustic echo, wherein the monitoring subsystem determines rates of change of the plurality of statistical values and if one or more of the rates of change exceed corresponding threshold values, the monitoring subsystem generates the indication that the acoustic echo path has changed.

20. The control system of claim 19, wherein the monitoring subsystem generates the indication in response to any of the rates of change exceeding the corresponding threshold values.

21. A computer program product comprising program instructions stored in a computer-readable storage device that is not a signal or propagating wave, wherein the computer program product, when executed by a processor, detects changes in an acoustic echo path in an acoustic echo canceler that removes an estimate of acoustic echo from a microphone signal to produce an echo-canceled output, the program instructions comprising:
    program instructions for, responsive to first samples of the microphone signal, second samples of the echo-canceled output and third samples of the estimate of acoustic echo, determining at least one statistical value dependent on the first samples the second samples and the third samples;
    program instructions for determining a corresponding at least one rate of change of the at least one statistical value;
    program instructions for comparing the at least one rate of change to a corresponding at least one threshold value corresponding to the at least one statistical value;
    program instructions for, responsive to the at least one rate of change exceeding the corresponding threshold value, generating an indication that the acoustic echo path has changed.

22. The computer program product of claim 21, wherein the at least one statistical value includes a first absolute value of a first intermediate value, wherein the first intermediate value is equal to a first sum of a first coefficient of determination of the estimate of acoustic echo with respect to the microphone signal and a second coefficient of determination of the echo-canceled output with respect to the microphone signal less a constant, and further comprising program instructions for determining a first rate of change of the first absolute value, wherein the program instructions for comparing compare the first rate of change of the first absolute value to a first threshold value, and wherein the program instructions for generating an indication generate the indication if the first rate of change of the first absolute value exceeds the first threshold value.

23. The computer program product of claim 22, wherein the at least one statistical value includes a second absolute value of a second intermediate value, wherein the second intermediate value is equal to a second sum of a first energy of the echo-canceled output and a second energy of the estimate of the acoustic echo, wherein the second sum is normalized by a third energy of the microphone signal and further reduced by a constant to yield the first intermediate value, and further comprising program instructions for determining a second rate of change of the second absolute value, wherein the program instructions for comparing compare the second absolute value to a second threshold value, and wherein the program instructions for generating an indication generate the indication if either the first rate of change of the first absolute value exceeds the first threshold value or the second rate of change of the second absolute value exceeds the second threshold value.

24. The computer program product of claim 23, wherein the program instructions for generating an indication further generate the indication if a ratio of the first energy to the third energy exceeds a third threshold value.

25. The computer program product of claim 22, wherein the program instructions for generating an indication further generate the indication if a ratio of an energy of the echo-canceled output to an energy of the microphone signal exceeds a second threshold value.

26. The computer program product of claim 21, wherein the at least one statistical value includes a first absolute value of a first intermediate value, wherein the first intermediate value is equal to a second sum of a first energy of the echo-canceled output and a second energy of the estimate of the acoustic echo, wherein the second sum is normalized by a third energy of the microphone signal and further reduced by a constant to yield the first intermediate value, and further comprising program instructions for determining a first rate of change of the first absolute value, wherein the program instructions for comparing compare the first absolute value to a first threshold value, and wherein the program instructions for generating an indication generate the indication if either the first rate of change of the first absolute value exceeds the first threshold value.

27. The computer program product of claim 26, wherein the program instructions for generating an indication further generate the indication if a ratio of the first energy to the third energy exceeds a second threshold value.

28. The computer program product of claim 21, further comprising program instructions for:
    modeling the acoustic echo path with an adaptive modeler; and
    at least one of increasing at least one of a rate of update or increasing a step size of the adaptive modeler in response to the indication.

29. The computer program product of claim 21, wherein the acoustic echo canceler includes a plurality of echo-canceling channels that remove a plurality of estimates of acoustic echo from a plurality of corresponding microphone signals to produce a corresponding plurality of echo-canceled outputs, wherein the program instructions for determining at least one statistical value determine one or more statistical values corresponding to the plurality of echo-canceling channels dependent on corresponding ones of first samples of the plurality of microphone signals, second samples of the plurality of echo-canceled outputs and third samples of the plurality of estimates of acoustic echo, to determine a corresponding plurality of statistical values dependent on the first samples, the second samples, and the third samples, wherein the program instructions for determining the corresponding at least one rate of change of the at least one statistical value determine corresponding rates of change of the plurality of statistical values, wherein the program instructions for comparing compare the rates of change to corresponding threshold values, and wherein the program instructions for generating generate the indication in response to the rates of change exceeding the corresponding threshold values.

30. The computer program product of claim 29, wherein the program instructions for generating generate the indication in response to any of the rates of change exceeding the corresponding threshold values.

\* \* \* \* \*

UNITED STATES PATENT AND TRADEMARK OFFICE
CERTIFICATE OF CORRECTION

PATENT NO. : 10,827,076 B1
APPLICATION NO. : 16/815936
DATED : November 3, 2020
INVENTOR(S) : Li et al.

Page 1 of 2

It is certified that error appears in the above-identified patent and that said Letters Patent is hereby corrected as shown below:

On the Title Page

Item (56), under "U.S. PATENT DOCUMENTS", in Column 2, Line 3, delete "Seibert et al." and insert -- Seibert --, therefor.

In the Drawings

In Fig. 2, Sheet 2 of 12, delete " " and insert -- 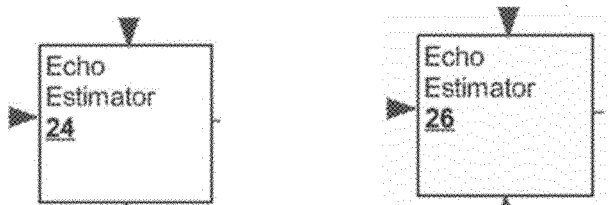 --, therefor.

In Fig. 2, Sheet 2 of 12, delete " 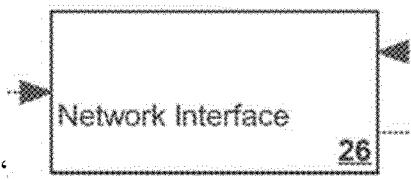 " and insert -- 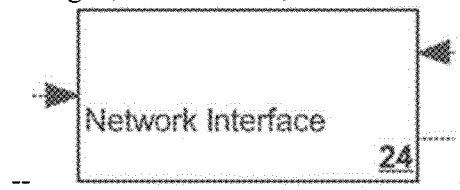 --, therefor.

Signed and Sealed this
Twelfth Day of January, 2021

Andrei Iancu
*Director of the United States Patent and Trademark Office*

CERTIFICATE OF CORRECTION (continued)
U.S. Pat. No. 10,827,076 B1

In Fig. 7, Sheet 11 of 12, delete " 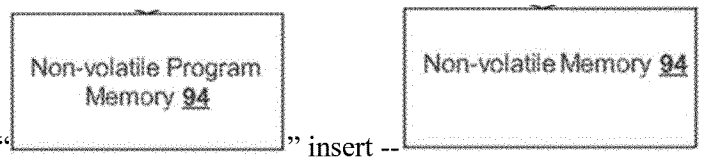 " insert -- -- , therefor.

In the Specification

In Column 3, Line 53, delete "pickup" and insert -- pick up --, therefor.

In Column 6, Line 5, delete "Correlation Metric=$|r_y^2+r_e^2-1|$" and insert
-- Correlation Metric=$|r_{\hat{y}}^2+r_e^2-1|$ --, therefor.

In Column 6, Line 6, delete "$r_y^2$" and insert -- $r_{\hat{y}}^2$ --, therefor.

In Column 7, Lines 57-58, delete "I/O block provides 95" and insert -- I/O block 95 provides --, therefor.

In Column 8, Line 40, delete "100A, 100B . . . , 100N" and insert -- 100A, 100B, . . . , 100N --, therefor.

In the Claims

In Column 11, Line 14, in Claim 13, delete "monitoring system" and insert -- monitoring subsystem --, therefor.

In Column 11, Line 36, in Claim 16, delete "monitoring system" and insert -- monitoring subsystem --, therefor.

In Column 12, Line 17, in Claim 21, delete "the first samples the second samples" and insert -- the first samples, the second samples --, therefor.